United States Patent Office 3,375,201
Patented Mar. 26, 1968

3,375,201
SILICA GEL-ASBESTOS COMPOSITIONS
Milton E. Winyall, 116 Beachwood Drive,
Ellicott City, Md. 21043
No Drawing. Filed Oct. 20, 1965, Ser. No. 499,065
9 Claims. (Cl. 252—194)

ABSTRACT OF THE DISCLOSURE

A non-decrepitating desiccant silica gel is prepared by admixing asbestos fiber with a silica hydrosol, gelling the hydrosol and subsequently drying and activating the gelled product at elevated temperatures. The present silica-asbestos desiccant possessed increased decrepitation resistance.

---

This invention relates to desiccant compositions which have an increased resistance to decrepitation and to methods for making these compositions. In particular, this invention relates to desiccant silica gel-asbestos compositions and to processes for forming these compositions.

In summary, one embodiment of the process of this invention is a method for forming a desiccant silica gel-asbestos composition with increased decrepitation resistance comprising the steps of preparing a silica hydrosol-asbestos fiber mixture having a silica content within the range of from 5 to 20 weight percent, a pH of less than 5, and a temperature below 150° F., said mixture containing from 2 to 10 percent of dispersed asbestos fibers expressed as weight percent silica, permitting the hydrosol to gel, washing the silica hydrogel-asbestos composition with an aqueous solution having a pH of less than 4.0, and drying and activating the composition.

In summary, another embodiment of the process of this invention is a method for forming a desiccant silica gel-asbestos composition with increased decrepitation resistance comprising the steps of preparing a silica hydrosol-asbestos fiber mixture having a silica content within the range of from 4 to 10 weight percent, a pH within the range of from 9.5 to 10.9 and a temperature below 150° F., said silica hydrosol containing 2 to 10 percent of dispersed asbestos fibers expressed as weight percent silica, permitting the hydrosol to gel, contacting the silica gel-asbestos composition with an aqueous solution of a mineral acid having a pH below 3.2 and a temperature below 75° C. until neutralization of the composition is substantially complete, washing the silica hydrogel-asbestos composition, and drying and activating the composition.

In summary, the composition of this invention is a silica gel-asbestos composition comprising a desiccant silica gel and from 2 to 10 weight percent asbestos fibers, said composition having a water adsorption capacity of at least 6 weight percent at 10 percent relative humidity and 77° F. and an increased resistance to decrepitation when contacted with water. The preferred composition of this invention is a non-decrepitating silica gel-asbestos composition consisting essentially of a desiccant silica gel and from 2 to 10 weight percent of crocidolite fibers.

One of the better known desiccants is commercial silica gel which comprises an extensive lattice defining a system of void spaces which permit the adsorption of water from air. These silica gels have an enormous internal surface area and an infinite number of small diameter capillaries which enable the gels to adsorb vapors, condensing them and holding them as liquids. Silica gels having desiccant characteristics can be characterized as having a surface area within the range of from 500 to 1000 m.$^2$/g. and an equilibrium water adsorption at room temperature of more than 5 percent at 10 percent relative humidity and more than 30 percent at 80 percent relative humidity.

These gels are commonly used as desiccants in enclosed refrigerant circuits where water accumulation can create serious difficulties. However, common desiccant silica gels exhibit a tendency to decrepitate when contacted with water. In refrigerant circuits, for example, decrepitation can occur when dislodged accumulations of water contact the gel. The gel fragments can obstruct expansion valves and interfere with the operation of other portions of the refrigerant circuits.

It is the object of this invention to provide desiccant silica gel compositions having an increased resistance to decrepitation and to provide a method for forming these compositions.

Concentrations are herein given as weight percents unless otherwise indicated.

The first stage of the process of this invention comprises preparing a silica hydrosol-asbestos fiber mixture from an aqueous alkali metal silicate solution, a mineral acid, and asbestos fibers. The asbestos can be introduced into the mixture by either mixing it with the alkali metal silicate solution or by dispersing it into the silica hydrosol.

Suitable alkali metal silicates include sodium and potassium silicates. The concentrations of the alkali metal silicates in the initial aqueous solution can be any value which will provide the requisite silica concentration in the hydrosol, and will depend upon the strength of the acid solution employed. Alkali metal silicate concentrations which are excessively high or low are generally undesirable because proper mixing with the corresponding acid solution is difficult. Alkali metal silicate solutions containing from 5 to 20 percent silica can be employed, for example. The silica to alkali metal oxide weight ratio in the alkali metal silicate solution is not critical and can vary over a wide range, for example from 3.75 to 1:1, calculated as $SiO_2/Na_2O$. The higher weight ratios are preferred for economic reasons.

Mineral acids which can be employed include sulfuric acid, hydrochloric acid, nitric acid, phosphoric acid, carbonic acid, and the like. The acid concentrations which can be employed are determined by the alkali metal silicate solution concentration, the particular desired silica concentration in the hydrosol, and the desired pH of the hydrosol. The acid concentrations which are required can be determined from the related parameters.

Any type of asbestos fibers can be employed to increase the decrepitation resistance of the desiccant silica gel composition of this invention. Suitable types of asbestos include chrysotile, anthophyllite, amosite, tremolite, crocidolite, and the like. It has been found that chrysotile fibers improve the hardness and attrition resistance of silica gels. Crocidolite fibers are uniquely suitable for forming a non-decrepitating desiccant silica gel. Therefore, crocidolite fibers are greatly preferred in the process of this invention. The length of the asbestos fibers present in the composition of this invention has been found to be important. The asbestos fibers should be as long as possible. If long fibers are not employed, use of excessive quantities of asbestos are necessary, lowering the product density and water adsorption capacity. The fibers should be well dispersed to provide maximum decrepitation resistance to the silica gel. The asbestos should be well opened to provide a product having improved strength and hardness. Suitable dispersion and opening of the asbestos fibers and fiber bundles has been obtained using a colloid mill such as a Cowles Morehouse mill or a high shear mixer such as a Waring Blendor.

In one embodiment of the process of this invention, the alkali metal silicate solution is mixed with a sufficient quantity of the mineral acid to provide greater than 100 percent neutralization of the alkali metal silicate. The quantity of mineral acid employed is sufficient to provide a hydrosol pH of less than 5 and preferably of less than 2.0. The concentrations of the alkali metal silicate solution and mineral acid are chosen to provide a hydrosol concentration of from 10 to 20 and preferably from 16 to 19 percent silica. The hydrosol temperature should be within the range of from 60 to 150° F. and preferably within the range of from 60 to 90° F. The initial reaction product of the alkali metal silicate solution and the mineral acid is a silica hydrosol.

An asbestos fiber dispersion can be provided in the silica hydrosol by several techniques. The asbestos fibers can be dispersed in the alkali metal silicate solution prior to mixing the silicate solution with the mineral acid. Alternatively, the asbestos can be dispersed in the silica hydrosol reaction product prior to gelation. The quantity of asbestos added to the alkali metal silicate solution or to the silica hydrosol is sufficient to provide from 2 to 10 percent and preferably from 2.5 to 4.0 percent asbestos fiber in the final silica gel-asbestos product composition.

The silica hydrosol-asbestos fiber mixture is then permitted to form a hard gel. The size and shape of the silica hydrogel can be controlled by permitting the hydrosol-asbestos mixture to gel in molds. Another conventional technique comprises introducing the hydrosol-asbestos mixture into a heated oil bath wherein the gel is formed in the shape of droplets. Alternatively, bulk gelation techniques can be employed, and the silica hydrogel-asbestos composition can be broken into smaller pieces prior to the washing and drying steps.

The silica hydrogel-asbestos composition is then washed to remove soluble impurities. These washing steps can comprise rinsing the silica hydrogel with a dilute mineral acid or acid salt solution, preferably having a temperature of less than 170° F., until the alkali metal ions are substantially removed from the gel structure. The pH of the wash solution should be maintained below 4.0 and preferably below 3.4.

The washed silica hydrogel-asbestos composition is then dried at temperatures within the range of from about 110 to 250° C. until the total moisture content of the silica is within the range of from 5 to 15 percent, and preferably from 5.5 to 7.5 percent. For example, the composition can be dried at a temperature of from 110 to 150° C. in a forced draft oven until the composition has a moisture content of less than 10 percent, and the silica gel-asbestos composition can then be activated by heating at temperatures within the range of from 200 to 250° C. until the moisture content of the composition is within the range of from 5 to 7 percent.

In another process of this invention, a low density desiccant silica gel-asbestos composition is formed. Low density desiccant compositions are found by alkaline gelation techniques. The silica hydrosol is formed by mixing an alkali metal silicate solution with a quantity of a mineral acid insufficient to provide complete neutralization of the alkali metal silicate. The hydrosol concentration is within the range of from 3 to 12 weight percent silica and the pH is within the range of from 9.5 to 10.4 and preferably from 10.0 to 10.2. The asbestos fibers can be dispersed either into the alkali metal silicate solution or into the silica hydrosol, as described above. The partially neutralized silica hydrosol is permitted to form a hard gel. Then complete neutralization of the alkali metal silicate is obtained by further treatment with a mineral acid. The silica hydrogel-asbestos composition is contacted or soaked with a mineral acid or an aqueous solution thereof to effect at least 100 percent neutralization. The acid preferably has a pH below 3.0. The quantity of acid employed and the duration of the acid treatment is preferably sufficient to effect a final, equilibrium gel mixture pH of less than 3.0. It is essential that the soda in the hydrogel be completely neutralized. Preferably, the final neutralization of the soda should be in excess of 100 percent. Acid treatment to effect a pH of less than 3.0 is essential to the formation of a fine pore structure and desiccant properties in the final product. The temperature of the acid solution in which the gel-asbestos composition is soaked should be less than 75° C. Excessive acid solution temperatures tend to reduce the number of fine pores in the product composition. Temperatures within the range of from about 25 to 50° C. are preferred because a chance of excessive aging of the gel is eliminated. Then the silica hydrogel-asbestos composition is washed, dried and activated as described above.

The silica gel-asbestos composition of this invention comprises a desiccant silica gel and from 2 to 10 percent asbestos fibers. Preferably, the composition contains from 2.5 to 4.0 percent asbestos fibers. The term desiccant silica gel is used to describe a silica gel which has an equilibrium water adsorption capacity of greater than 6 percent at 10 percent relative humidity and greater than 30 percent at 80 percent humidity at 77° F. The water adsorption capacity at the low and high relative humidities can be considered a characterization of the pore structure and surface area of the composition.

All types of asbestos have been found to provide improved decrepitation resistance in the final composition. Decrepitation of the compositions was determined by contacting prescreened gels having a size of 3 to 8 mesh with water and determining the percentages of the compositions which were retained on Tyler 8 mesh screens and which were passed through Tyler 30 mesh screens. Amosite, tremolite, and anthophyllite provided the least improvement in decrepitation resistance of the final composition. Furthermore, tremolite was found to decrease the water adsorption capacity of the silica gel-asbestos compositions at low relative humidities. Chrysotile asbestos fibers provided a marked improvement in decrepitation resistance of the final gel composite and also improved the hardness and attrition resistance of the final product. However, chrysotile fibers were found to decrease the water adsorption capacity of the silica gel at low relative humidities. Crocidolite asbestos fibers were found to be uniquely superior. Using crocidolite fibers, a non-decrepitating gel composition was formed which did not exhibit any impairment of the water adsorption capacity of the gel at low relative humidities.

The processes and composition of this invention are further illustrated by the following specific but non-limiting examples:

*Example 1*

This example shows the advantages obtained by providing several types of asbestos fibers in desiccant silica gels.

The silica hydrosol was formed by mixing carefully metered streams of sodium silicate and sulfuric acid solutions into a small chamber containing a large, high speed stirrer. The sodium silicate solution had a $SiO_2/Na_2O$ ratio of 3.3:1 and a concentration of 22.8% silica. The sulfuric acid solution employed contained 50% sulfuric acid. The sodium silicate solution and sulfuric acid solution were metered at rates sufficient to produce a silica hydrosol having a concentration of 15% silica. In each run the asbestos fibers were mixed with the silica hydrosol in a Waring Blendor for 2 minutes. The mixture was at room temperature. Then the silica hydrosol-asbestos mixture was gelled and aged until hard. The silica hydrogel-asbestos compositions were washed for 24 hours with a 3.2 pH sulfuric acid solution having a temperature of 60° C. In each run the gel-asbestos balls were dried for 16 hours at 150° C. and were activated by heating for 2 hours at 200° C.

The decrepitation resistances of the activated silica gel-asbestos compositions were determined by the following procedures. The silica gel-asbestos compositions were broken up, and the portion was separated which passed through a 3 mesh screen but was retained by an 8 mesh screen, Tyler mesh. Five grams of the activated, sized gel was soaked in 100 ml. of water for 30 minutes. It was then screened with 8 and 30 mesh screens. The three fractions obtained were then dried and weighed. The fractions which were retained on the 8 mesh screen and which passed through the 30 mesh screen were reported.

The water adsorption capacity, attrition resistance, and physical properties of the products were measured, and the results are shown in Table A.

decrepitating. With asbestos concentrations in excess of 10%, it can be seen that water adsorption at low relative humidities is impaired.

Obviously many modifications and variations of this invention as hereinabove set forth may be made without departing from the essence and scope thereof, and only

TABLE A

| Run No. | 1 | 2 | 3 | 4 | 5 | 6 |
|---|---|---|---|---|---|---|
| Asbestos: | | | | | | |
| Type | | Crocidolite | Chrysotile | Chrysotile | Amosite | Tremolite |
| Concentration, wt. percent | 0 | 5 | 4.9 | 9.6 | 4.7 | 5 |
| Water Adsorption, wt. percent: | | | | | | |
| 10% R.H. | 6.67 | 7.89 | 3.76 | 3.23 | 7.41 | 4.83 |
| 20% R.H. | 11.90 | 14.00 | 7.38 | 5.88 | 13.47 | 8.20 |
| 80% R.H. | 33.02 | 33.41 | 47.43 | 52.39 | 34.63 | 41.77 |
| Attrition, wt. percent: | | | | | | |
| On 8 mesh | 31 | 16 | 21 | 22 | 9 | 16 |
| On 14 mesh | 22 | 26 | 32 | 33 | 20 | 29 |
| Decrepitation, wt. percent: | | | | | | |
| Visual | Yes | No | No | No | No | Yes |
| On 8 mesh | 4 | 100 | 100 | 100 | 100 | 43 |
| Through 30 mesh | 4 | 0 | 0 | 0 | 0 | 1 |
| Other Properties: | | | | | | |
| Density, g./cc. | 0.66 | 0.57 | 0.46 | 0.40 | 0.53 | 0.52 |
| Surface area, m.²/g | | 513 | 697 | 527 | 679 | 710 |
| Pore volume, cc./g | | 0.28 | 0.57 | 0.62 | 0.38 | 0.48 |

As shown in Table A, all types of asbestos improved the decrepitation resistance of the desiccant silica gel. However, the attrition resistance of the gel containing amosite was impaired. The water adsorption capacity of the gels containing chrysotile and tremolite at low relative humidities was decreased. The chrysotile fibers improved the attrition resistance and hardness of the gels. By far the most superior asbestos was crocidolite which provided a superior gel in terms of attrition resistance, and without any impairment of the water adsorption capacity of the gel at low relative humidities.

*Example 2*

This example shows the effect of the crocidolite asbestos fiber concentration in the silica gel. The silica gel compositions in this example were formed and tested by the procedures described in Example 1. However, in Run No. 9 the asbestos-silica hydrosol mixture was mixed in the Waring Blendor for 3 minutes. The results obtained are shown in Table B.

The attrition resistances of the silica gel-asbestos compositions were determined by the following procedures. One gram of the activated gel composition, sized to pass through a 3 mesh screen and to be retained by a 8 mesh screen was placed in a cup together with a small coin such as a dime. The cup was then placed on a Spex Mixer Mill for one minute, and the gel was then screened with 8 and 14 mesh screens.

The compositions were also tested to determine water adsorption capacity, density, surface area and pore volume by standard techniques as described in Example 1. The results obtained in these tests are shown in Table B.

such limitations should be applied as are indicated in the appended claims.

I claim:

1. A process for forming a desiccant silica gel composition with increased decrepitation resistance comprising the steps of
   (a) dispersing from 2 to 10 weight percent of asbestos fibers, based on the weight of silica, in an alkali metal silicate solution, the silica to alkali metal oxide ratio expressed as $SiO_2/Na_2O$ being from 3.75:1 to about 1:1,
   (b) mixing the alkali metal silicate solution with a quantity of a mineral acid sufficient to provide at least 100 percent neutralization of the alkali metal silicate whereby a silica hydrogel-asbestos mixture is formed, which contains about 10 to 20% silica,
   (c) permitting the hydrosol-asbestos mixture to gel, at a temperature of about 60–150° F.,
   (d) washing the gelled silica hydrogel-asbestos composition with aqueous acid having a pH below 4.0 to remove alkali metal ions therefrom, and
   (e) drying the composition at a temperature of 110° to 250° C. to reduce the moisture content to about 5 to 15%.

2. The process of claim 1 wherein the asbestos fibers are crocidolite fibers.

3. A process for forming a desiccant silica gel-asbestos composition with increased decrepitation resistance comprising the steps of
   (a) dispersing from 2 to 10 weight percent of asbestos fibers, based on the weight of silica in a silica hy-

TABLE B

| Run No. | 1 | 7 | 8 | 2 | 9 |
|---|---|---|---|---|---|
| Asbestos: Concentration, wt. percent | 0 | 1 | 2.5 | 5 | 10 |
| Water adsorption, wt. percent: | | | | | |
| 10% R.H. | 6.67 | 6.83 | 7.97 | 7.89 | 6.68 |
| 20% R.H. | 11.90 | 12.68 | 14.34 | 14.00 | 12.22 |
| 80% R.H. | 33.02 | 34.02 | 36.88 | 33.41 | 34.99 |
| Attrition, wt. percent: | | | | | |
| On 8 mesh | 31 | 25 | 12 | 16 | 22 |
| On 14 mesh | 22 | 27 | 33 | 26 | 29.5 |
| Decrepitation, wt. percent: | | | | | |
| Visual | Yes | Yes | No | No | No |
| On 8 mesh | 4 | 0 | 100 | 100 | 100 |
| Through 30 mesh | 4 | 85 | 0 | 0 | 0 |
| Other Properties: | | | | | |
| Density, g./cc. | 0.66 | 0.65 | 0.62 | 0.57 | 0.39 |
| Surface area, m.²/g | | 703 | 603 | 513 | 529 |
| Pore volume, cc./g | | 0.38 | 0.34 | 0.28 | 0.31 |

As shown in Table B, at least 2% asbestos is required to provide a silica gel-asbestos composition which is nondrosol having a silica content within the range of 10 to 20 weight percent and a pH of less than 5, (b) permitting the mixture to gel, at a temperature of 60–150° F.,
(c) washing the gelled silica gel-asbestos composition with aqueous acid having a pH below 4.0 to remove alkali metal ions therefrom, and
(d) drying the composition at a temperature of 110 to 250° C. to reduce the moisture content to below about 7%.

4. The process of claim 3 wherein the asbestos fibers are crocidolite fibers.

5. A process for forming a low density desiccant silica gel-asbestos composition comprising the steps of
(a) preparing a silica hydrosol-asbestos mixture having a silica content within the range of from 3 to 12 weight percent and a pH within the range of from 9.5 to 10.4, said silica hydrosol containing from 2 to 10 percent of dispersed asbestos fibers, expressed as weight percent silica,
(b) permitting the mixture to gel at a temperature of 60–150° F.,
(c) contacting the gelled silica gel-asbestos composition with a quantity of a mineral acid sufficient to provide at least 100 percent neutralization of the alkali metal silicate,
(d) washing the silica gel-asbestos composition with aqueous acid having a pH below 4.0 to remove alkali metal ions therefrom, and
(e) drying the composition at a temperature of 110 to 250° C. to reduce the moisture content to less than about 7% by weight.

6. The process of claim 5 wherein the asbestos fibers are crocidolite fibers.

7. The process of claim 5 wherein the silica hydrogel-asbestos composite is contacted with a mineral acid solution having a temperature within the range of from 25 to 75° F.

8. A desiccant silica gel-asbestos composition consisting essentially of silica gel and from 2 to 10 percent asbestos fibers, expressed as weight percent silica, said composition having an equilibrium adsorption capacity for water of greater than 6 weight percent at 10 percent relative humidity, and said composition having an increased resistance to decrepitation when contacted with water.

9. The composition of claim 8 wherein the asbestos fibers are crocidolite fibers, and the composition is non-decrepitating when contacted with water.

References Cited

UNITED STATES PATENTS 2,900,349   8/1959   Schwartz _____ 252—317
2,966,466  12/1960   Schwartz _____ 252—448 XR LEON D. ROSDOL, *Primary Examiner.*

S. D. SCHWARTZ, *Assistant Examiner.*